Jan. 2, 1962  C. V. KUNZ  3,015,508

TUBE-TO-TUBE SHEET FABRICATION

Filed Sept. 22, 1959

INVENTOR
CLEON V. KUNZ
BY M. B. Tasker
ATTORNEY

United States Patent Office 3,015,508
Patented Jan. 2, 1962

3,015,508
TUBE-TO-TUBE SHEET FABRICATION
Cleon V. Kunz, West Hartford, Conn., assignor to United Aircraft Corporation, East Hartford, Conn., a corporation of Delaware
Filed Sept. 22, 1959, Ser. No. 841,645
4 Claims. (Cl. 287—20.2)

This invention relates to a method for joining thin-walled tubes and heavy tube sheets by welding and articles formed by this method. It is particularly applicable in cases where oblong, or flattened, tubes enter the tube sheet at some angle other than 90° and where very severe corrosive operating conditions are encountered.

The use of welded joints between thin-walled tubes and heavy tube sheets always requires special preparation of the weld joint or special techniques to be used by the welder. Where flattened tubes enter the tube sheet at an angle departing appreciably from 90°, the weld joint preparation becomes extremely difficult to machine and special welding techniques have proved unsatisfactory.

It is an object of this invention to eliminate the need for special welding techniques and for special weld joint preparation under the above conditions.

Another object of the invention is to obtain uniform heat distribution across the weld joint during welding by providing a two-layer tube sheet, one layer of which is of substantial thickness, and the other of which is of a thickness approximately equal to the tube wall thickness to the latter of which the tube is welded to provide a seal against internal pressure.

A further object of the invention is to provide such a two-layer tube sheet and to securely locate the tube in the tube-sheet assembly by brazing it to the heavy sheet.

A further object of the invention is to provide a cavity around the tube to insure full weld penetration of the light tube sheet by relieving the surface of the heavy tube sheet adjacent the light sheet.

A still further object of the invention is to eliminate complicated trepanning operations.

A yet further object of the invention is to provide a trough about the end of the tube by removing material from the tube and from the thin outer sheet to eliminate feather edges, which burn during welding, and to smooth out the flow passage along the tube sheet by allowing the weld bead to lie nearly flush with the surface of the sheet.

A further object of the invention is generally to improve the art of welding and welded articles.

These and other objects and advantages of the invention will become evident or will be specifically pointed out in connection with the following description of a preferred embodiment of the invention illustrated in the accompanying drawing.

In this drawing.

Figure 1:
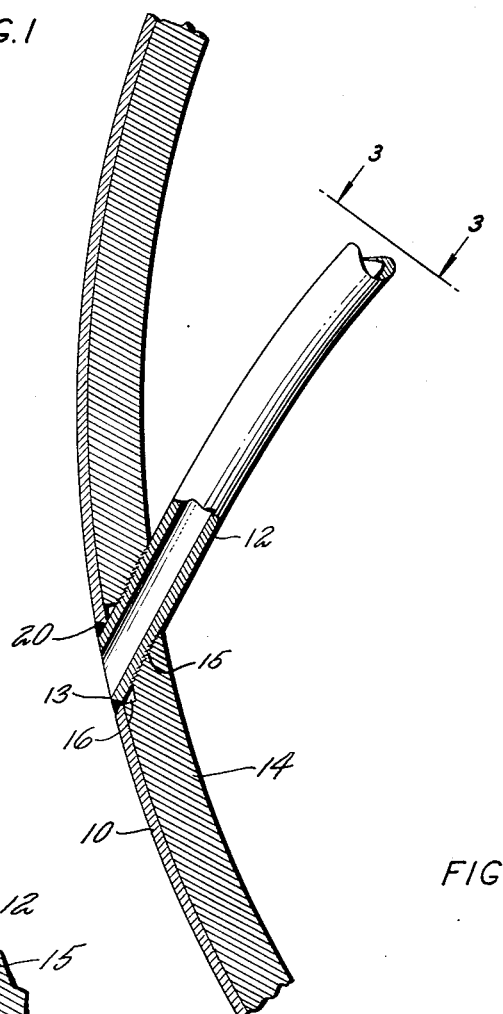
FIG. 1 is a sectional elevation through a welded joint between a flattened tube and a two-walled tube sheet in accordance with this invention.
Figure 2:
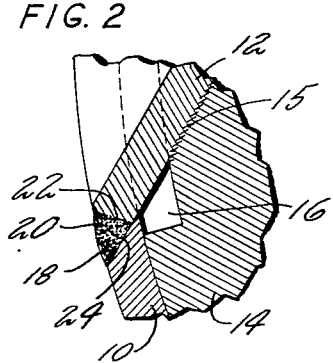
FIG. 2 is an enlarged view in the vicinity of the weld.

Referring to FIG. 1, a two-layer tube sheet is provided having an outer thin sheet 10 which has substantially the same thickness as the wall thickness of the tube 12 and an inner thicker sheet 14 which is sufficiently thick to provide the required strength for the tube-sheet assembly.

Figure 3:
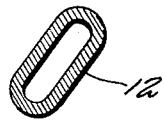
FIG. 3 is a section through the tube on line 3—3 of FIG. 1.

Tube 12 is flattened as appears in FIG. 3 and, in addition, it intersects the tube sheet at an oblique angle with its end 13 tangential to the curbed outer face of tube 10. This creates a situation in which a weld is made with great difficulty by the usual methods.

In accordance with the invention, the difficulties in making a weld under these conditions are overcome by having the outer tube sheet 10 of substantially the same wall thickness as the wall thickness of tube 12, thus providing a desirable one-to-one thickness ratio across the weld joint which results in uniform heat distribution across the weld joint during welding. Also by relieving the surface of tube sheet 14, a cavity 16 is provided in the face of this inner sheet about the periphery of tube 12 which allows full weld penetration when tube 12 is welded to sheet 10, i.e., it is possible to obtain a weld between tube 12 and sheet 10 which extends completely through the thickness of sheet 10.

Tube 12 is brazed at 15 to the thicker tube sheet 14 along its length which is contiguous with the tube sheet. This braze holds the tube firmly in sheet 14 which serves as the strength member of the dual-layer tube sheet.

Further, in connection with making the weld between sheet 10 and tube 12, a trough 18 is formed between sheet 10 and the end of tube 12 to receive the weld bead 20 which acts as the seal between tube 12 and sheet 10 to retain internal pressure.

The trough 18 is formed in part by removing material from the end of the tube by chamfering at 22 where it forms an obtuse angle with sheet 10 and in part by chamfering the tube passage through sheet 10 at 24 where the tube 12 makes an acute angle with the sheet 10. By reason of the trough 18 it is possible to make the weld and form the bead substantially flush with the outer face of sheet 10 so that no serious impediment to free fluid flow along the outer surface of sheet 10 results.

As a result of this invention, it is made possible to successfully weld flattened thin-wall tubes to a heavy tube sheet, even when the tube approaches the sheet at an oblique angle.

Further, it will be evident that as a result of this invention, provision has been made to obtain a full penetration weld with a seal-forming bead substantially flush with the tube surface over which unobstructed fluid flow can take place.

While only one embodiment of the invention has been shown and described, it will be understood that various changes in the construction and arrangement of the parts may be made within the scope of the appended claims.

I claim:

1. A tube and tube-sheet assembly comprising a two-layer tube sheet having a tube aperture therein, a thin-walled tube having one end received in said aperture, said tube sheet including an outer layer having a wall thickness approximately equal to the wall thickness of said tube and an inner layer having a relatively thick wall, a welded connection between said outer layer and said tube, and a brazed connection between said inner layer and said tube, said inner thick-walled tube-sheet layer having a cavity formed therein around the tube at the base of the welded connection between the tube and the outer tube-sheet layer.

2. A tube-to-tube-sheet welded assembly comprising a two-layer tube sheet having a tube aperture therein, a thin-walled tube having one end received in said aperture, the end of said tube conforming in cross section to the cross section of said aperture, said tube sheet including an outer layer having a wall thickness approximately equal to the wall thickness of said tube and an inner layer having a relatively thick wall, a welded connection between said tube and said outer layer, and means for obtaining a full penetration weld including a cavity formed in the outer face of said inner layer around the tube at the base of said welded connection.

3. A method of making a tube-to-tube-sheet welded assembly which comprises the steps of, making a two-layer tube sheet in which the outer layer is formed with a wall thickness approximately equal to the wall thickness of the tube and the inner layer is formed with a substantially greater thickness, forming an aperture in the tube sheet to conform in cross section to the cross section of the tube, inserting one end of the tube in said aperture with its extremity flush with the outer surface of said outer layer, relieving the outer surface of the inner layer about the tube, chamfering the outer edge of the aperture and the extremity of the tube as required to provide a continuous V-shaped trough around the extremity of the tube, welding said outer layer to said tube, and forming a pressure-retaining seal between said tube and outer layer by forming a weld bead in said trough, the surface of which lies nearly flush with the outer surface of said outer layer.

4. The method of making a tube and tube-sheet assembly which comprises the steps of, making a two-layer tube sheet in which the outer layer is formed with a wall thickness approximately equal to the wall thickness of the tube and the inner layer is formed with a substantially greater thickness, forming an aperture in the tube sheet to conform in cross section to the cross section of the tube, inserting one end of the tube in said aperture with its extremity flush with the outer surface of said tube sheet, providing for a full penetration weld by relieving the outer surface of said inner layer about said tube, providing a continuous trough about the extremity of said tube, welding said tube to said outer layer while filling said trough with a seal-forming weld bead substantially flush with the outer surface of said outer layer, and brazing said tube to said inner layer over their contiguous surfaces to provide a strong support for said tube.

References Cited in the file of this patent
UNITED STATES PATENTS

| | | |
|---|---|---|
| 1,787,580 | Jasper | Jan. 6, 1931 |
| 2,050,339 | Kidd | Aug. 11, 1936 |